United States Patent
Sugitani et al.

(10) Patent No.: US 8,934,789 B2
(45) Date of Patent: Jan. 13, 2015

(54) OPTICAL RECEIVER, OPTICAL RECEPTION METHOD AND OPTICAL RECEPTION SYSTEM

(71) Applicant: Fujitsu Limited, Kawasaki (JP)

(72) Inventors: Kiichi Sugitani, Fukuoka (JP); Kazunari Shiota, Kasuga (JP); Eri Katayama, Fukuoka (JP); Takahito Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 38 days.

(21) Appl. No.: 13/960,103

(22) Filed: Aug. 6, 2013

(65) Prior Publication Data
US 2014/0119731 A1  May 1, 2014

(30) Foreign Application Priority Data
Nov. 1, 2012 (JP) ................. 2012-242097

(51) Int. Cl.
*H04B 10/06* (2006.01)
*H04B 10/61* (2013.01)
*H04J 14/06* (2006.01)

(52) U.S. Cl.
CPC ............ *H04B 10/614* (2013.01); *H04B 10/616* (2013.01)
USPC ............... 398/205; 398/65; 398/208

(58) Field of Classification Search
USPC ................... 398/65, 202, 205, 208
See application file for complete search history.

(56) References Cited

U.S. PATENT DOCUMENTS

| 2009/0214201 A1 | 8/2009 | Oda et al. | |
| 2010/0054759 A1* | 3/2010 | Oda et al. | 398/202 |
| 2012/0082464 A1* | 4/2012 | Yasuda et al. | 398/152 |
| 2012/0148266 A1* | 6/2012 | Komaki et al. | 398/210 |

FOREIGN PATENT DOCUMENTS

| JP | 2009-198364 | 9/2009 |
| WO | WO 2011/083748 A1 | 7/2011 |

* cited by examiner

*Primary Examiner* — Daniel Dobson
(74) *Attorney, Agent, or Firm* — Staas & Halsey LLP

(57) ABSTRACT

An optical digital coherent receiver includes: a polarization separation circuit configured to perform polarization separation on a received signal and output polarized signals; and a determination circuit configured to trigger a start of digital signal processing in a stage subsequent to the polarization separation circuit when it is determined that a distribution of a peak of an amplitude of one of the polarized signals has a characteristic corresponding to a modulation method used on a transmitting side.

10 Claims, 21 Drawing Sheets

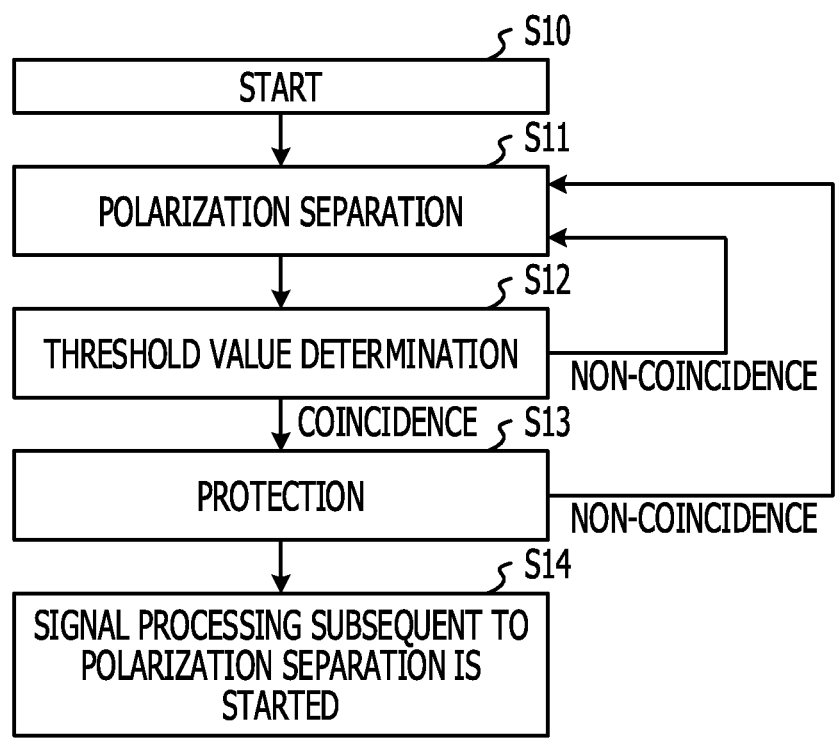

AT TIME OF QPSK MODULATION

AT TIME OF 16QAM MODULATION

FIG. 8A
FIG. 8B
AT TIME OF QPSK MODULATION
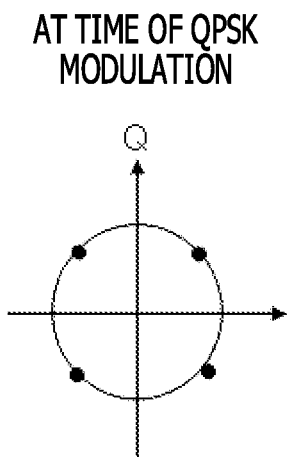
AT TIME OF 16QAM MODULATION
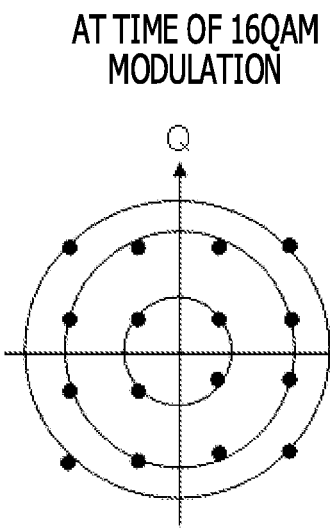

US 8,934,789 B2

OPTICAL RECEIVER, OPTICAL RECEPTION METHOD AND OPTICAL RECEPTION SYSTEM

CROSS-REFERENCE TO RELATED APPLICATION

This application is based upon and claims the benefit of priority of the prior Japanese Patent Application No. 2012-242097, filed on Nov. 1, 2012, the entire contents of which are incorporated herein by reference.

FIELD

The embodiments discussed herein are related to an optical receiver, an optical reception method and an optical system.

BACKGROUND

As a next-generation optical communication technique, a digital coherent optical reception system is provided where a coherent optical reception system and a digital signal processing technique are combined.

Related art is disclosed in Japanese Patent No. 4816830 or Japanese Laid-open Patent Publication No. 2009-198364.

SUMMARY

According to one aspect of the embodiments, an optical digital coherent receiver includes: a polarization separation circuit configured to perform polarization separation on a received signal and output polarized signals; and a determination circuit configured to trigger a start of digital signal processing in a stage subsequent to the polarization separation circuit when it is determined that a distribution of a peak of an amplitude of one of the polarized signals has a characteristic corresponding to a modulation method used on a transmitting side.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a processing flowchart;

FIG. 8A and FIG. 8B illustrate an example of a number of peaks of an amplitude;

DESCRIPTION OF EMBODIMENTS

Figure 1:
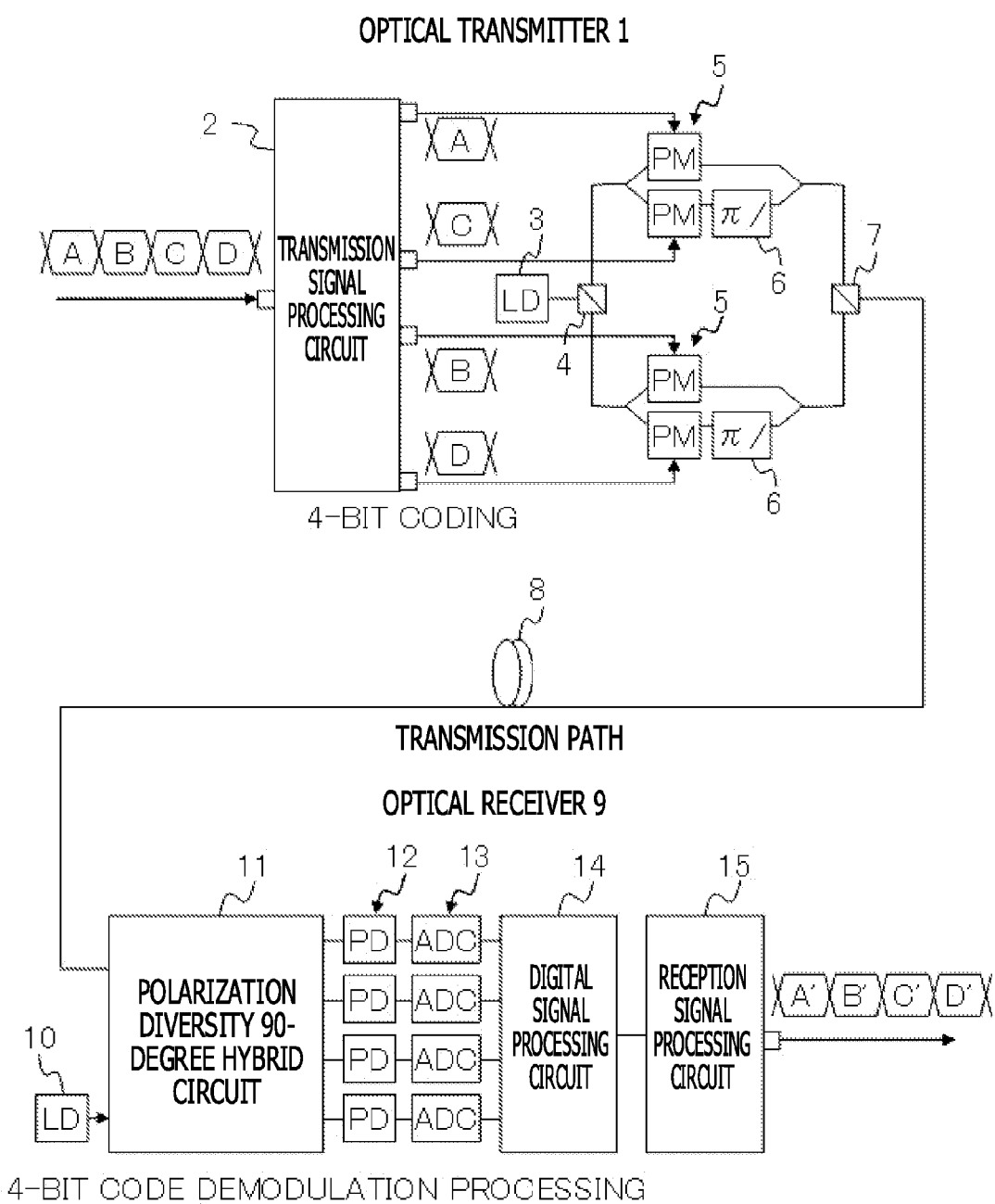
FIG. 1 illustrates an example of an optical communication system.

FIG. 1 illustrates an example of an optical communication system. In FIG. 1, polarization multiplexing and QPSK modulation are used. In the optical communication system illustrated in FIG. 1, light generated in a light source 3 in an optical transmitter 1 is separated into orthogonal polarization components by a polarization separator 4. Individual lights of an X polarization and a Y polarization are further split into two branches, and individually supplied to phase modulators 5.

The lights input to the individual phase modulators 5 are phase-modulated in accordance with a transmission signal processed in a transmission signal processing circuit 2. After one of one pair of lights corresponding to the individual polarizations has been shifted by π/2 owing to a phase shifter 6, the lights of the individual polarizations are multiplexed in a polarization multiplexer 7. A 4-bit coded optical signal is transmitted from the optical transmitter 1 to an optical receiver 9 through a transmission path 8.

In the optical receiver 9, an optical signal from the transmission path 8 and a local oscillation light output from a local oscillation light source 10 are supplied to a polarization diversity 90-degree hybrid circuit 11. The output lights of the hybrid circuit 11 are converted into electrical signals by photodetectors 12. The outputs of the polarization diversity 90-degree hybrid circuit 11 are a total of four signals including I and Q components with respect to each of the X polarization and the Y polarization. After having been converted into digital signals by A/D converters 13, reception signals are supplied to a digital signal processing circuit 14 and a reception signal processing circuit 15, and 4-bit code demodulation processing is performed.

4-bit information is transmitted within one symbol time between the optical transmitter 1 and the optical receiver 9. In FIG. 1, pieces of 4-bit transmission data to be subjected to coding processing in the optical transmitter 1 are referred to as A, B, C, and D. Pieces of 4-bit reception data subjected to demodulation processing in the optical receiver 9 are referred to as A', B', C', and D'.

Figure 2:
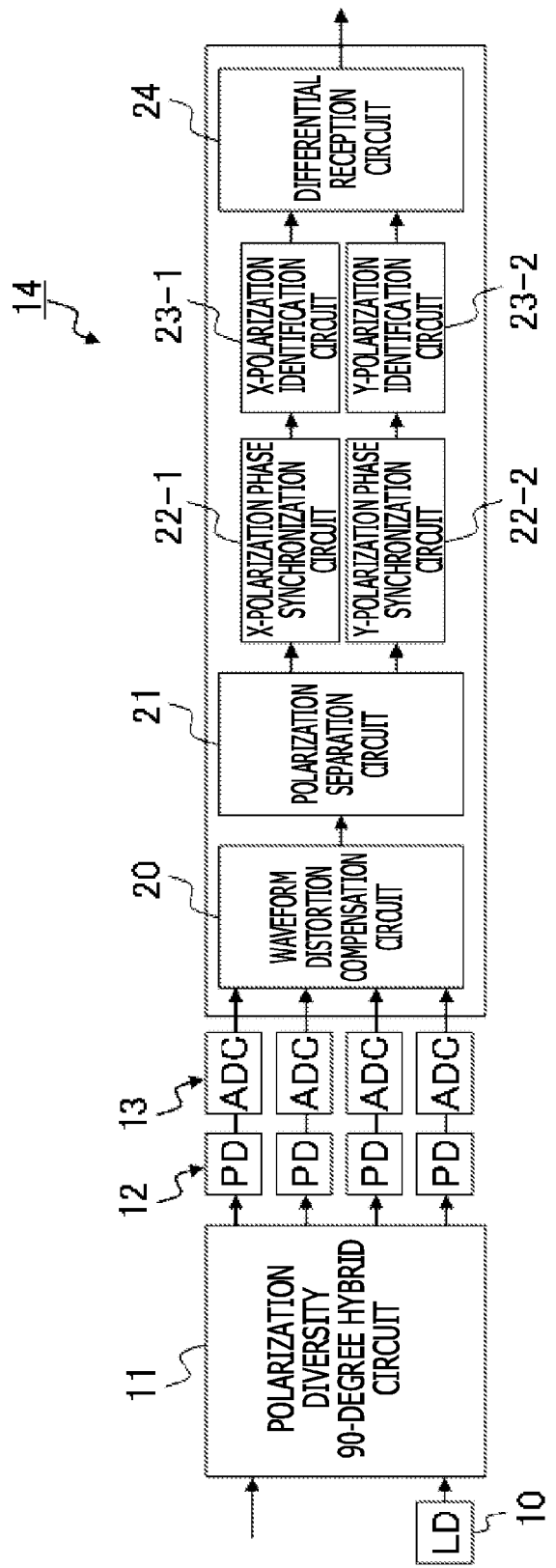
FIG. 2 illustrates an example of a digital signal processing circuit.

FIG. 2 illustrates an example of a digital signal processing circuit. The digital signal processing circuit 14 includes a waveform distortion compensation circuit 20, a polarization separation circuit 21, an X-polarization phase synchronization circuit 22-1, a Y-polarization phase synchronization circuit 22-2, an X-polarization identification circuit 23-1, a Y-polarization identification circuit 23-2, and a differential reception circuit 24.

The waveform distortion compensation circuit 20 compensates the distortion of a signal occurring owing to the chromatic dispersion or the like of a transmission path. The polarization separation circuit 21 individually separates, into an X-polarization component and a Y-polarization component, polarization components that have been inseparable in the polarization diversity 90-degree hybrid circuit 11. The X-polarization phase synchronization circuit 22-1 and the Y-polarization phase synchronization circuit 22-2 individually synchronize the phase of an X-polarized signal or a Y-polarized signal. The X-polarization identification circuit 23-1 and the Y-polarization identification circuit 23-2 individually perform signal identification with respect to the X-polarized signal or the Y-polarized signal. The differential reception circuit 24 receives, as signal information, a differential signal between the X-polarized signal and the Y-polarized signal.

The polarization separation circuit 21 includes four finite impulse response (FIR) filters (butterfly filters), and calculates filter coefficients using an algorithm called constant modulus (CMA) when a receiver knows a modulation method on a transmitting side.

Figure 3:
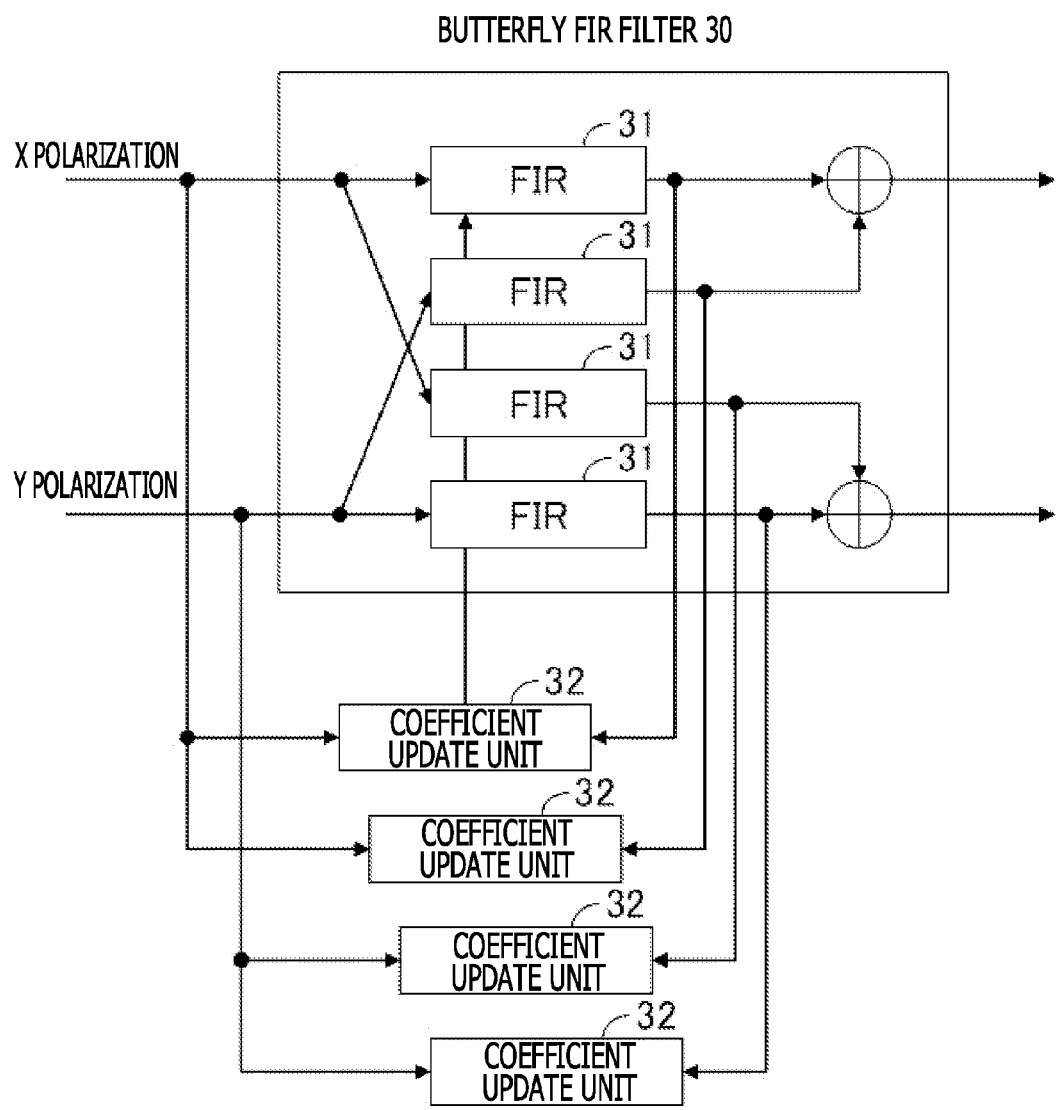
FIG. 3 illustrates an example of a polarization separation circuit.
Figure 4:
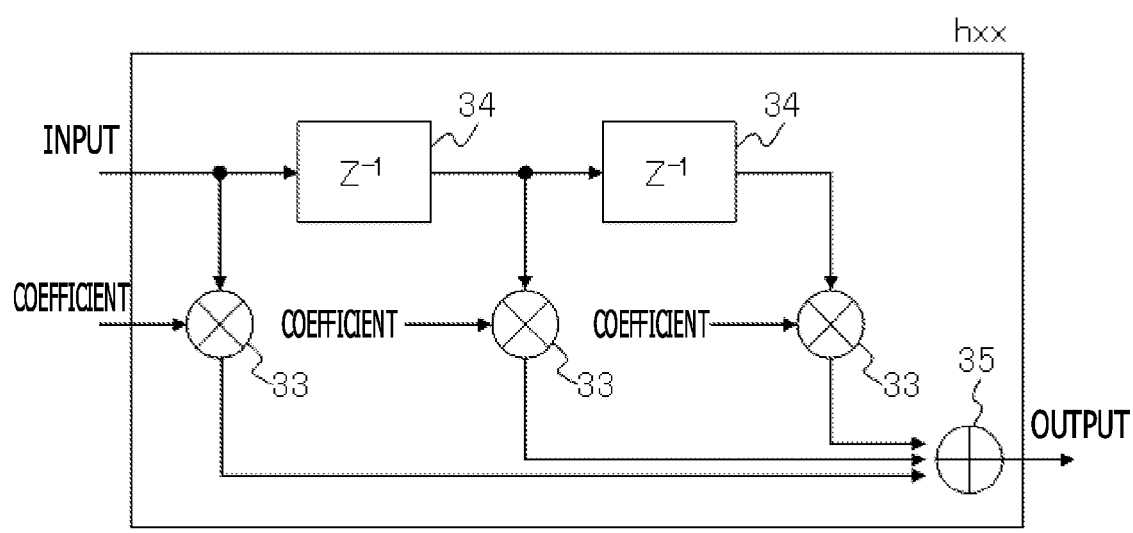
FIG. 4 illustrates an example of a polarization separation circuit.

FIG. 3 and FIG. 4 illustrate a example of a polarization separation circuit. In the polarization separation circuit illustrated in FIG. 3, a butterfly FIR filter 30 includes four FIR filters 31. Using the CMA algorithm, coefficient update units 32 calculate and update the filter coefficients of the FIR filters 31. In FIG. 4, a three-tap FIR filter is illustrated. A multiplier 33 multiplies an input signal by a filter coefficient, and the input signal is delayed by an amount corresponding to one symbol by a delay device 34. By such an operation as to delay and multiply by a filter coefficient, a signal value after the multiplication of a filter coefficient is added in a sequential adder 35 and output.

Based on feedback control, the filter coefficient slowly fluctuates and converges, and hence, a stable state, for example, a state is generated where desired signal processing may be performed. A time taken to become becoming the stable state is unequable depending on a communication situation. Therefore, in view of the worst case, the time taken to become the stable state is set. After the time taken to become the stable state has elapsed, the processing proceeds to a synchronization circuit in a subsequent stage. Therefore, the start of processing performed in a stage subsequent to the polarization separation circuit may be delayed.

For example, in the stage subsequent to the polarization separation circuit, a circuit may be provided that determines whether or not the operation of the polarization separation circuit has converged. For example, a determination function may be added to an LSI or an FPGA in the digital signal processing circuit. When the receiver has known the modulation method on the transmitting side, it is detected that the distribution of an amplitude at a reception signal point has become a distribution according to the modulation method. Accordingly, the stable operation of the polarization separation circuit is determined, and the phase synchronization circuit in the subsequent stage is triggered to start an operation.

Figure 5:
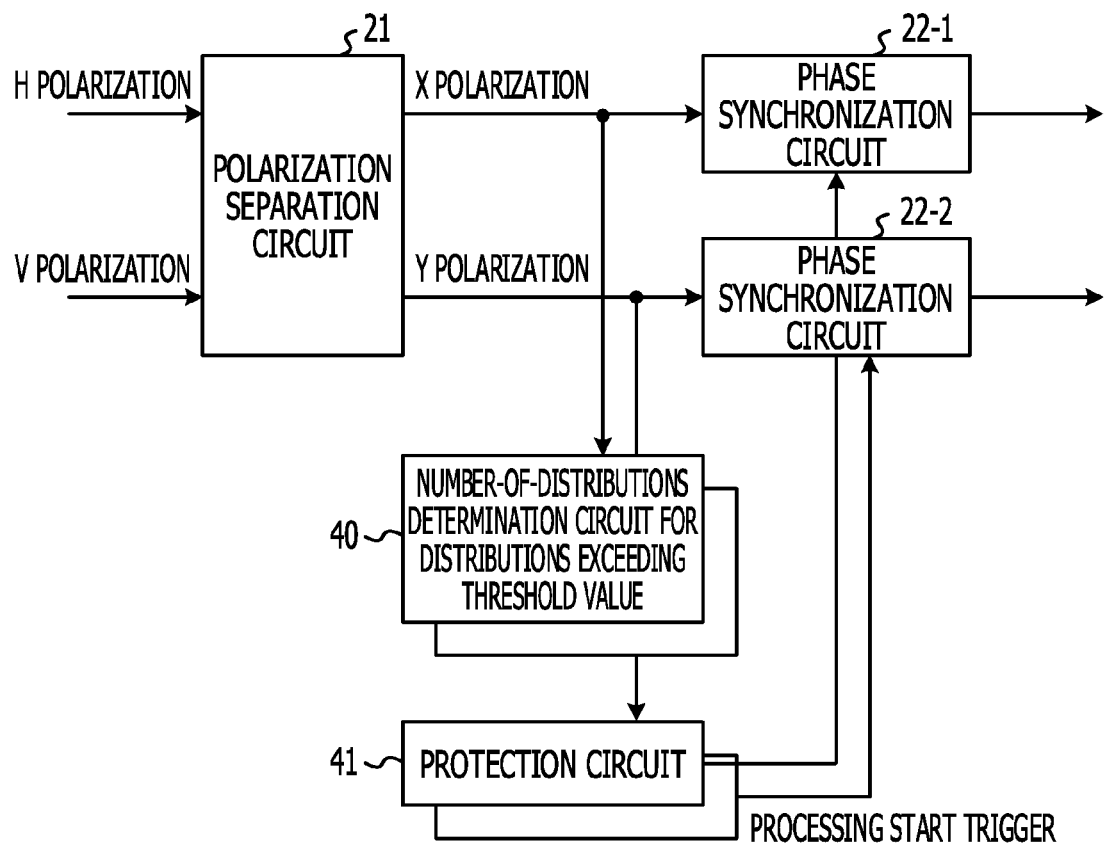
FIG. 5 illustrates an example of a system.

FIG. 5 illustrates an example of a system. In the system illustrated in FIG. 5, a number-of-distributions determination circuit 40 for distributions exceeding a threshold value and a protection circuit 41. In FIG. 5, signals, which have been separated into an H-polarized signal and a V-polarized signal by the polarization diversity 90-degree hybrid circuit, are subjected to polarization separation processing in the polarization separation circuit 21 and individually output as the X-polarized signal and the Y-polarized signal. The output of the polarization separation circuit 21 is supplied to the number-of-distributions determination circuit 40 for distributions exceeding a threshold value, and the number of signal points whose amplitudes are larger than a threshold value is determined. A hard logic is incorporated into the number-of-distributions determination circuit 40 for distributions exceeding a threshold value, so as to determine the number of the amplitudes of signal points in a used modulation method. The protection circuit 41 may be a circuit used for confirming that similar distributions are obtained more than once. When, in the protection circuit 41, it has been confirmed that similar distributions have been obtained more than once, and it has been determined that the operation of the polarization separation circuit 21 has converged, the processing start of the phase synchronization circuits 22-1 and 22-2 in the subsequent stage is triggered. The processing start may be triggered without involving the protection circuit 41.

In an operation S10, processing is started. In an operation 511, the polarization separation circuit performs polarization separation processing. In an operation S12, a comparison between the amplitude of a signal point and a threshold value is performed. When the modulation method on the transmitting side has been known, the number of the occurrences of the peaks of the distribution of the amplitudes of signal points exceeding the threshold value when the polarization separation processing has converged is understood. Therefore, it is determined whether or not the number of peaks where the amplitude of a signal point after polarization separation is larger than the threshold value for coincides with a number in an already-known modulation method. When the numbers coincide with each other, the processing proceeds to an operation S13, and when the numbers do not coincide with each other, the processing returns to the operation S11. In the operation S13, the protection circuit determines whether or not the number coincides with the number of stages in the protection circuit. When the numbers do not coincide with each other, the processing returns to the operation S11. When the numbers coincide with each other, signal processing start in a stage subsequent to the polarization separation processing is triggered in an operation S14.

Figure 7A:
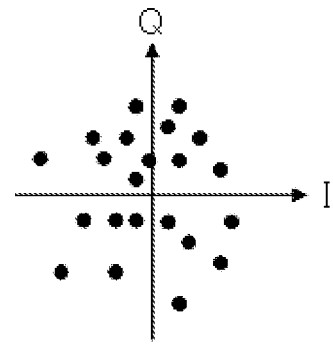
FIG. 7A to FIG. 7C illustrate an example of a number of peaks of an amplitude.
Figure 16:
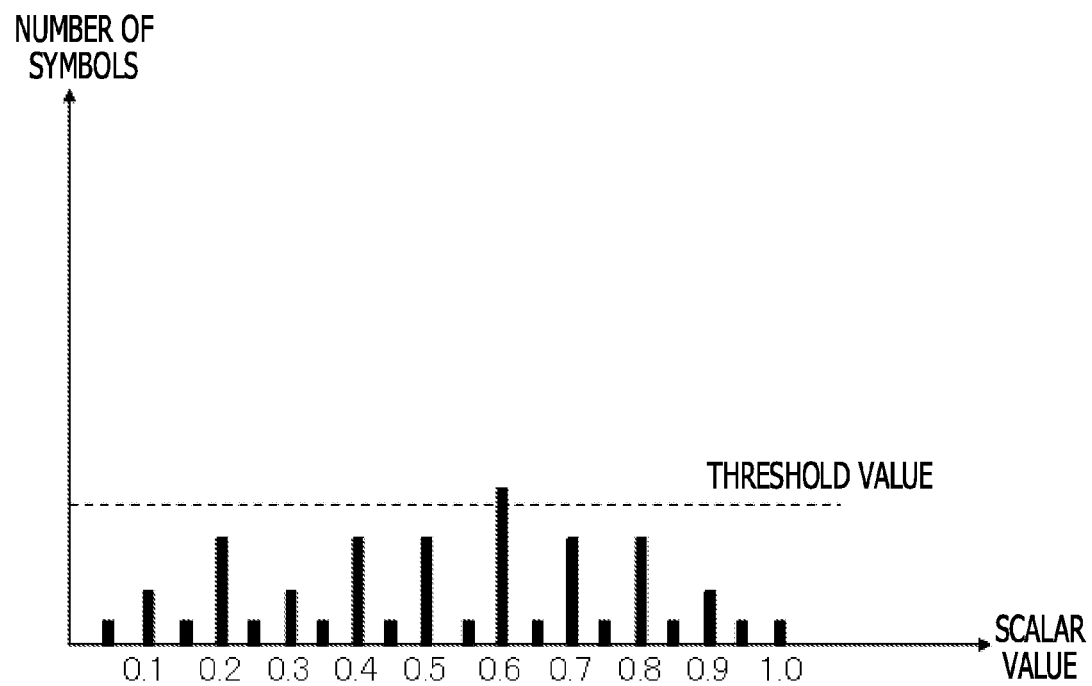
FIG. 16 illustrates an example of a determination method for a modulation method 64QAM.

FIG. 7A and FIG. 7B and FIG. 8A and FIG. 8B illustrate an example of a number of peaks of an amplitude. In FIG. 7A to FIG. 7C and FIG. 8A and FIG. 8B, relationships between modulation methods and the number of the peaks of the amplitudes of signal points are illustrated. When polarizations have not been sufficiently separated, signal points randomly exist within a constellation as illustrated in FIG. 7A. When the CMA is applied to the signal of this state, signal points collect around a circle whose amplitude is a given value at the time of QPSK modulation, as illustrated in, for example, FIG. 7B. When the CMA is applied to the signal, signal points collect on the circumference of a triple concentric circle or in the vicinity thereof on the constellation at the time of 16QAM modulation, as illustrated in, for example, FIG. 7C. The reason is that, as illustrated in FIG. 8A and FIG. 8B, signal points themselves generated in accordance with a certain modulation method are generated so as to have specific amplitudes on the constellation. For example, at the time of QPSK modulation, as illustrated in FIG. 8A, four signal points having the same amplitude are disposed on the circumference of the same circle. For example, at the time of 16QAM modulation, as illustrated in FIG. 8B, 16 signal points are disposed on the circumferences of three concentric circles whose amplitudes are different. 4 signal points are disposed on the circumference of the outmost circle, 4 signal points are disposed on the circumference of the innermost circle, and 8 signal points are disposed on the circumference of a middle circle.

Figure 7B:
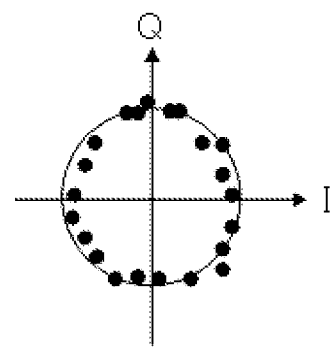
Figure 7C:
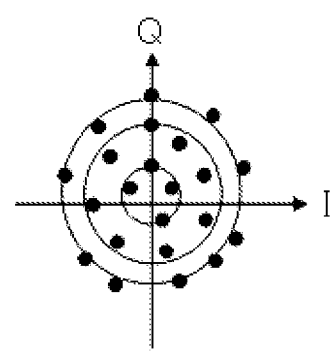

Signal points illustrated in FIG. 7A to FIG. 7C are distributed over the whole circumference in the vicinity of a circle owing to the influence of a transmission path. With further polarization separation, the amplitudes of the signal points may converge on values in the vicinity of the circumference of a certain circle.

As illustrated in FIG. 8A and FIG. 8B, when the modulation method has been already known, what signal points are generated on the transmitting side is understood. Therefore, on a receiving side, what circumference of a circle the amplitudes of signal points are disposed on may be recognized. Therefore, based on a comparison between the number of the amplitudes of signal points based on the already-known modulation method and the number of the peaks of the amplitudes of a reception signal on the constellation, on the receiving side it is determined whether or not polarization separation has been sufficiently performed.

As illustrated in FIG. 8B, in the 16QAM, while four signal points exist on each of the circumferences of the outer and inner circles, 8 signal points exist on the circumference of the middle circle. Therefore, as for the number of the collections of the signal points of a reception signal, the number of the signal points on the circumference of the middle circle is twice as many as the number of the signal points on each of the circumferences of the outer and inner circles. For example, 25% of the total number of signal points may collect on each of the circumferences of the outer and inner circles, and signal points of 50% may collect on the circumference of the middle circle.

Figure 9:
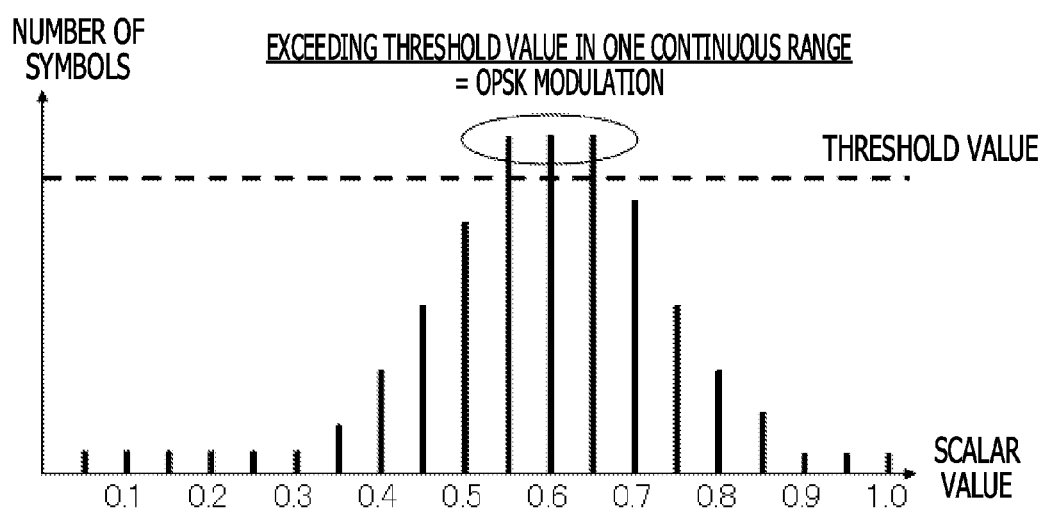
FIG. 9 illustrates an example of a determination method.

FIG. 9 illustrates an example of a determination method. In FIG. 9, a determination method when a modulation method is a QPSK method is illustrated. I and Q signals output from a polarization separation circuit is converted from a vector into a scalar (an amplitude=$\sqrt{(I^2+Q^2)}$). In accordance with a set particle size (the step size of a horizontal axis (an amplitude)), the number of signals belonging to each particle size is counted by an amount corresponding to the specific number of symbols, and the distribution of scalars is understood. The number of counts may be stored in, for example, an array variable ensured in a memory or the like within the number-of-distributions determination circuit 40 for distributions exceeding a threshold value.

Since the QPSK modulation has been preliminarily set, a point exceeding the threshold value is one point in the distribution of scalars. By detecting a point exceeding the threshold value, the completion of convergence is determined, and processing such as phase synchronization processing after polarization separation is started. Owing to protection functions in several stages, false detection may be reduced. A timing when determination is started may be set by a timer. For example, the determination may also be started immediately after the start-up of a device, and may also be started after 10000 clocks have elapsed from the start-up of a device.

The threshold value used for detecting a peak may be set, for example, as follows. Since, owing to the polarization separation, a signal converges to an original amplitude, a distribution ratio in the vicinity of the amplitude may only become high, and a distribution ratio may become low in other amplitudes. When the number of the original amplitudes is one, a distribution ratio close to 100% occurs. Therefore, one threshold value close to 100% is set. When, like the 16QAM, there are three peaks, a distribution is divided and distribution ratios become like, for example, 25%, 50%, and 25%. Since signals twice as many as in the other amplitudes exist in a middle amplitude, the distribution ratio becomes 50%. For example, a threshold value close to 50% may be set for the middle amplitude, and one threshold value may only be provided. Not only a threshold value close to 50% but also a threshold value close to 25% may be set, and the two threshold values may also be provided. Every time the number of original amplitudes is increased owing to a modulation method, the value of the threshold value may also be changed or increased. An initial value may also be set using the above-mentioned method, and an optimum threshold value may also be set on the basis of an experiment.

Figure 10:
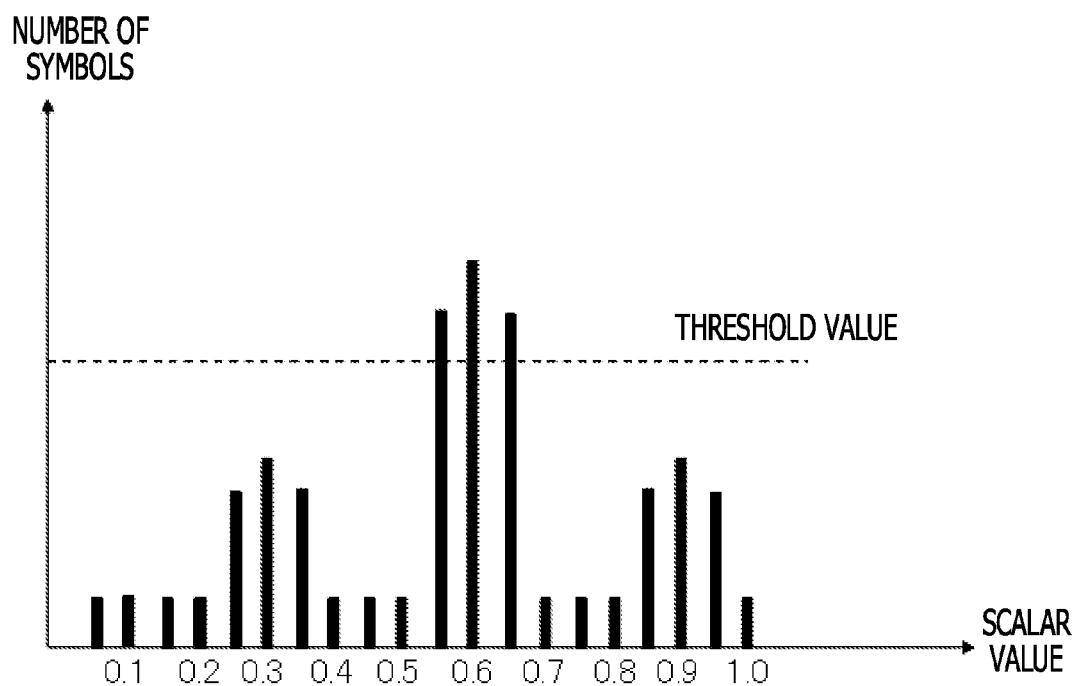
FIG. 10 illustrates an example of a determination method for a modulation method 16QAM.
Figure 11:
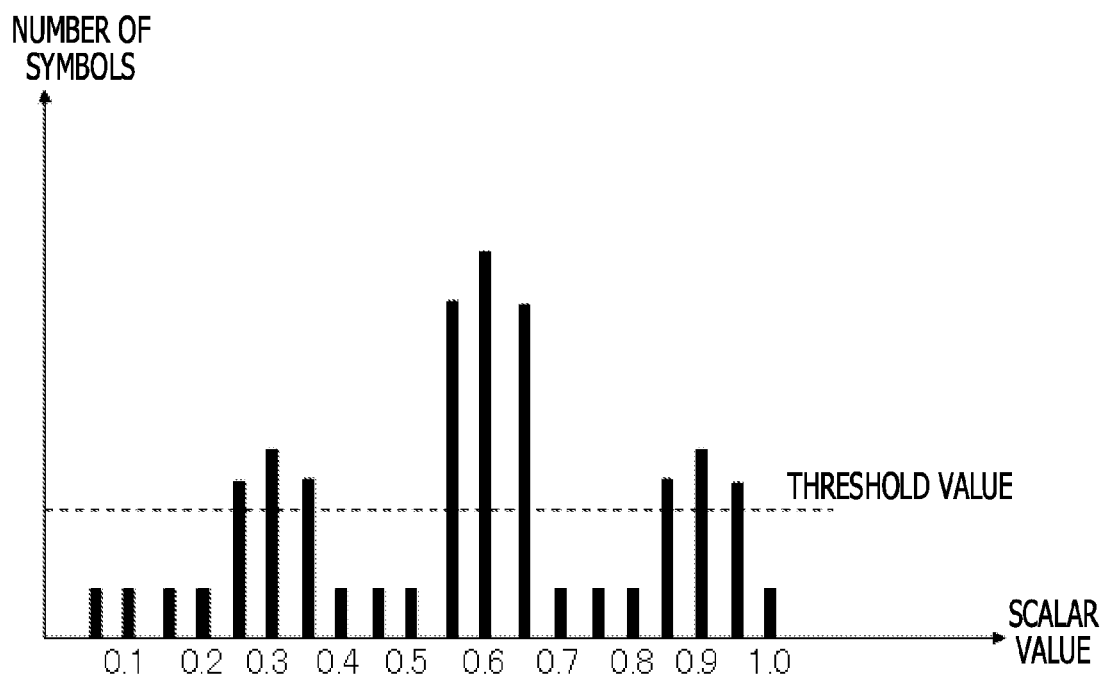
FIG. 11 illustrates an example of a determination method for a modulation method 16QAM.
Figure 12:
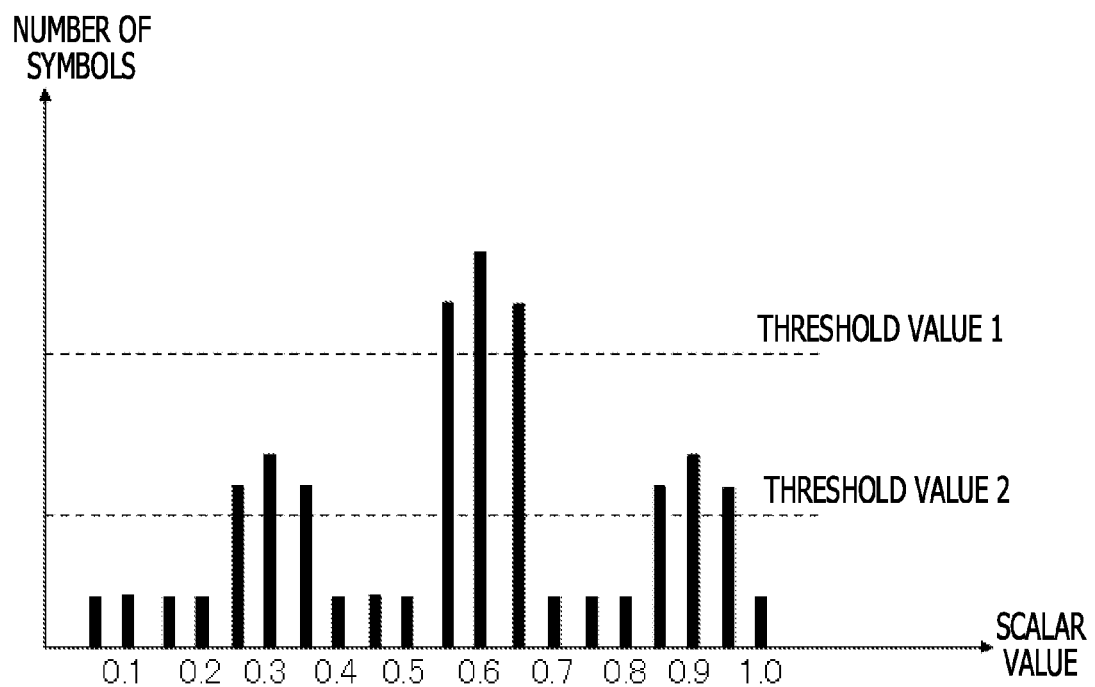
FIG. 12 illustrates an example of a determination method for a modulation method 16QAM.

FIG. 10 to FIG. 12 illustrate an example of a determination method for a modulation method 16QAM. A scalar distribution may be acquired in substantially the same way as in the case of the QPSK. Since the scalar distribution has three peaks, there may be three combinations of the setting of a threshold value and the determination method.

In FIG. 10, since, in the 16QAM, the distribution ratio of signal points of an amplitude in the middle is twice as high as the distribution ratios of the other amplitudes owing to a constellation at the time of transmission, the threshold value is only provided for the distribution of a central amplitude. Under the condition that the number of distributions is one, determination may be performed. In this case, since, as for the threshold value, the number of signal points collecting in the central amplitude becomes 50% of the total number of signal points, the value of the threshold value may be set to a value smaller than 50% of the total number of symbols.

In FIG. 11, the threshold value is set so that the determination is performed with respect to all the three peaks. For example, since each of the percentages of signal points collecting in the outer and inner amplitudes is 25%, the threshold value may be set to a value smaller than 25% of the total number of symbols. When there are three peaks of the number of symbols greater than or equal to the threshold value, the polarization separation converges and the 16QAM may be detected.

In FIG. 12, since distribution ratios at the peaks of the number of symbols are different, two threshold values are provided. One peak distribution may be determined at or above a threshold value 1, and two peak distributions may be determined at or above a threshold value 2 and below the threshold value 1. The three peak distributions may be determined at or above the threshold value 2. The threshold value 1 may be set to a value smaller than 50% of the total number of symbols, so as to detect the middle peak. The threshold value 2 may be set to a value smaller than 25% of the total number of symbols, so as to detect the outer and inner peaks. One peak greater than or equal to the threshold value 1 may exist, and two peaks greater than or equal to the threshold value 2 and less than the threshold value 1 may exist. The polarization separation converts and the 16QAM method may be detected based on the detection of three peaks greater than or equal to the threshold value 2.

Figure 13:
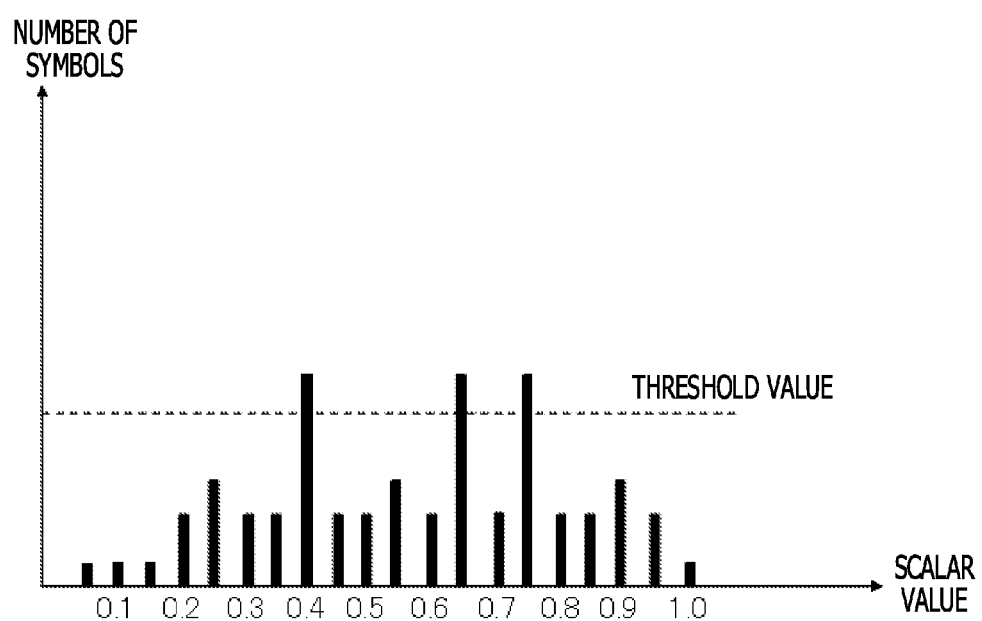
FIG. 13 illustrates an example of a determination method for a modulation method 36QAM.
Figure 14:
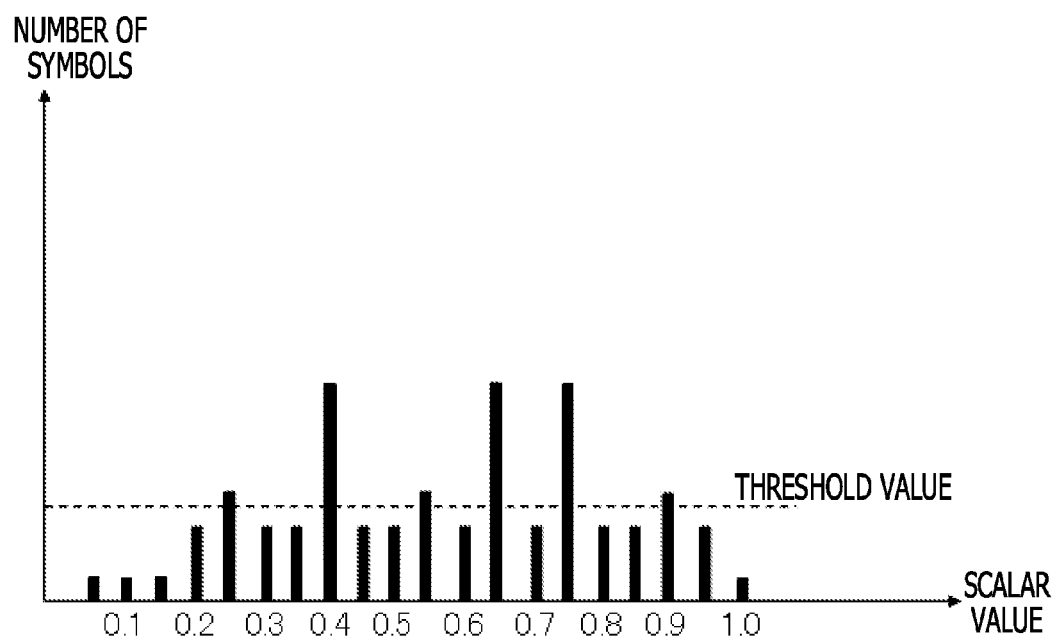
FIG. 14 illustrates an example of a determination method for a modulation method 36QAM.
Figure 15:
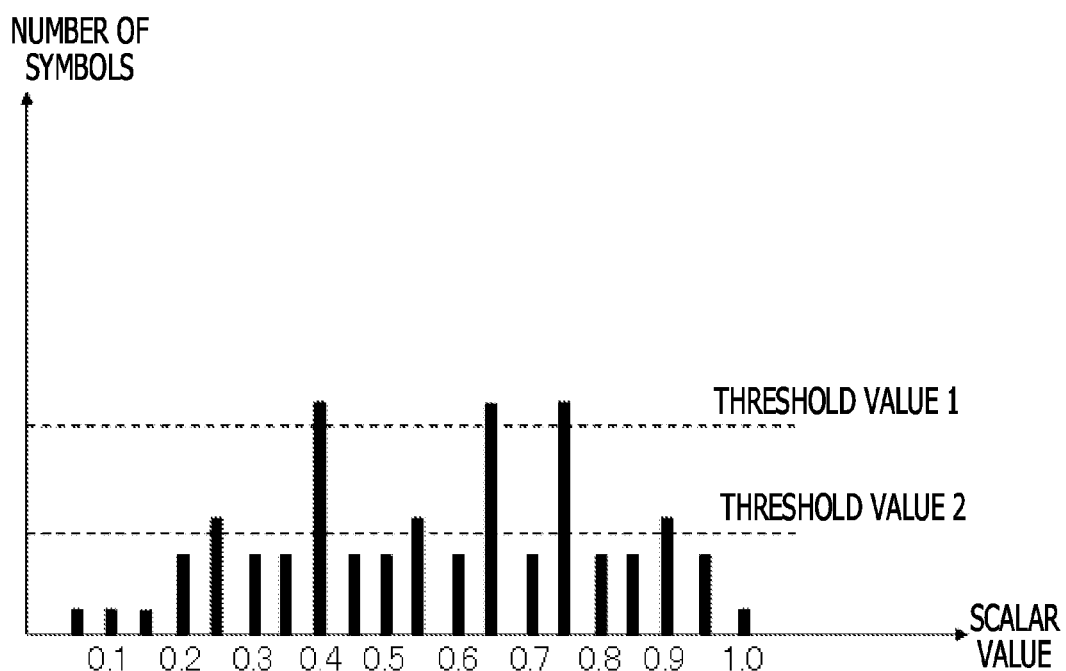
FIG. 15 illustrates an example of a determination method for a modulation method 36QAM.

FIG. 13 to FIG. 15 illustrate an example of a determination method for a modulation method 36QAM. Since the scalar distribution corresponds to distributions illustrated in FIG. 13 to FIG. 15, there may be three combinations of the setting of a threshold value and the determination method.

In FIG. 13, in the 36QAM, owing to a constellation at the time of transmission, the distribution of the number of symbols of the amplitudes of signal values is divided into two types. Therefore, a threshold value is only provided for a peak distribution whose number of symbols is large. Under the condition that the number of the distributions of peaks is three, determination may be performed.

In FIG. 14, a threshold value is provided so that six peak distributions are determined that includes large peaks and small peaks.

In FIG. 15, since the distribution ratio of symbols is different between the large peaks and the small peaks, two threshold values are provided. Three peak distributions may be determined at or above a threshold value 1, and three peak distributions may be determined at or above a threshold value 2 and below the threshold value 1. The six peak distributions may be determined at or above the threshold value 2.

As illustrated in FIG. 7A to FIG. 7C and FIG. 8A and FIG. 8B, the signal points of the 36QAM are disposed within the constellation, what circumference of a circle the amplitudes of signal points are disposed on is confirmed, and how many signal points are placed on the circumference of each circle is confirmed. Therefore, with respect to the total number of symbols, which peak symbols of what percent come to is confirmed, and a threshold value, or the threshold value 1 and the threshold value 2 may be determined. An experiment may be performed on a determined value, and the appropriate value of the threshold value, or the appropriate values of the threshold value 1 and the threshold value 2 may be determined.

FIG. 16 to FIG. 21 illustrate an example of a determination method for a modulation method 64QAM. Since the scalar distribution corresponds to distributions illustrated in FIG. 16 to FIG. 21, there may be six combinations of the setting of a threshold value and the determination method.

In FIG. 16, in the 64QAM, owing to a constellation at the time of transmission, the distribution of the number of symbols is divided into three types. A threshold value is only provided for a peak whose number of symbols is the largest. Under the condition that the number of peak distributions is one, determination may be performed.

Figure 17:
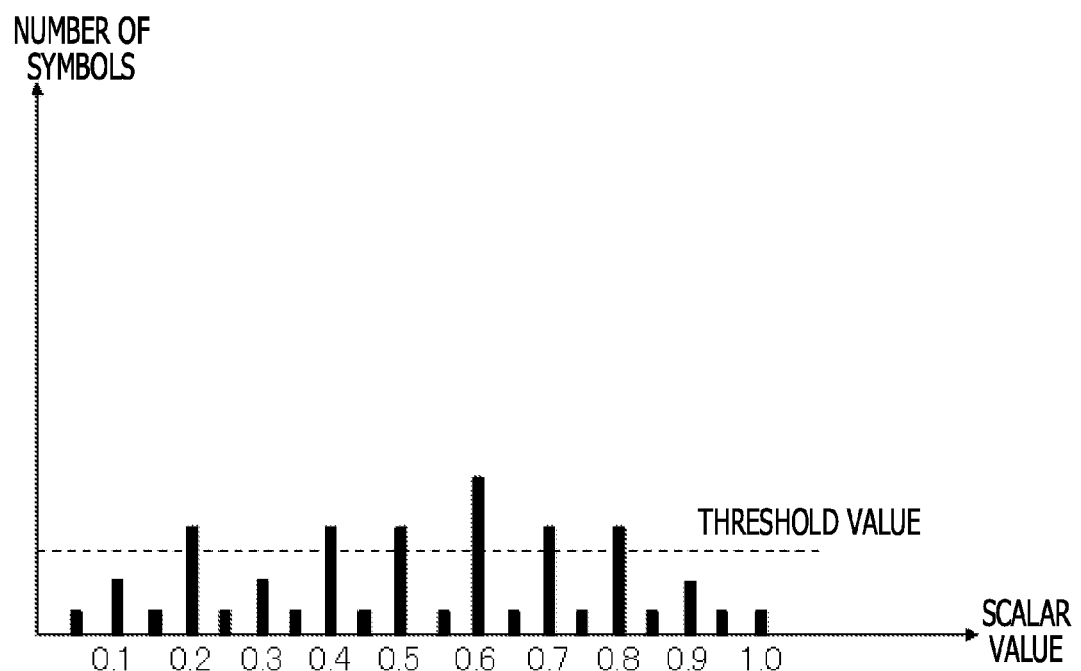
FIG. 17 illustrates an example of a determination method for a modulation method 64QAM.

In FIG. 17, a threshold value is provided that becomes greater than or equal to a peak whose number of symbols is the second largest. Under the condition that the number of peak distributions is six, determination may be performed.

Figure 18:
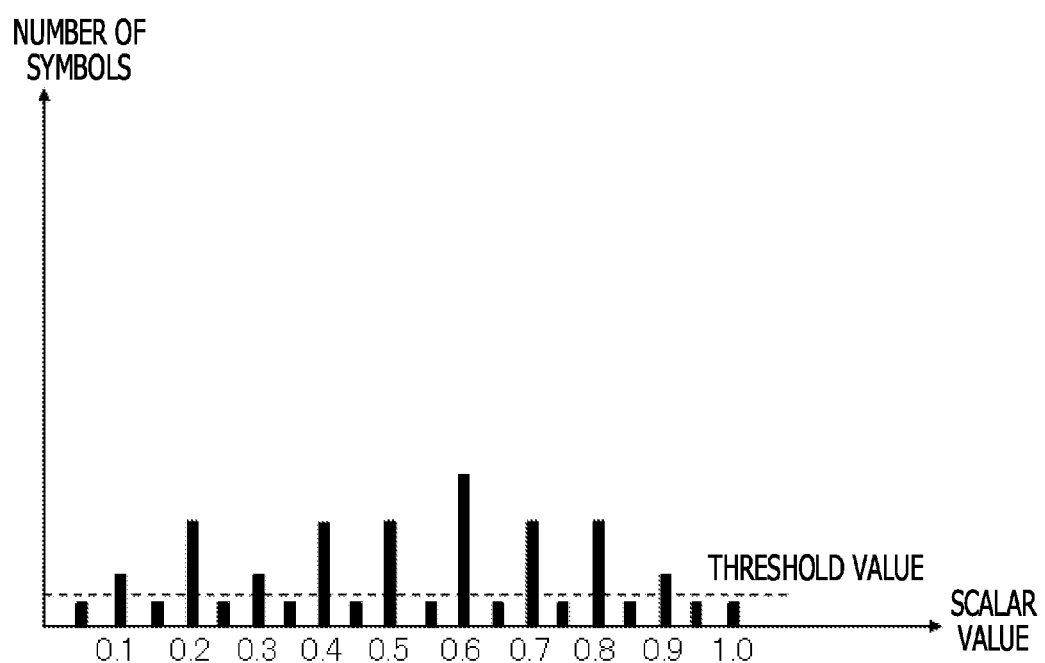
FIG. 18 illustrates an example of a determination method for a modulation method 64QAM.

In FIG. 18, a threshold value is provided so as to determine nine peak distributions including the smallest peak.

Figure 19:
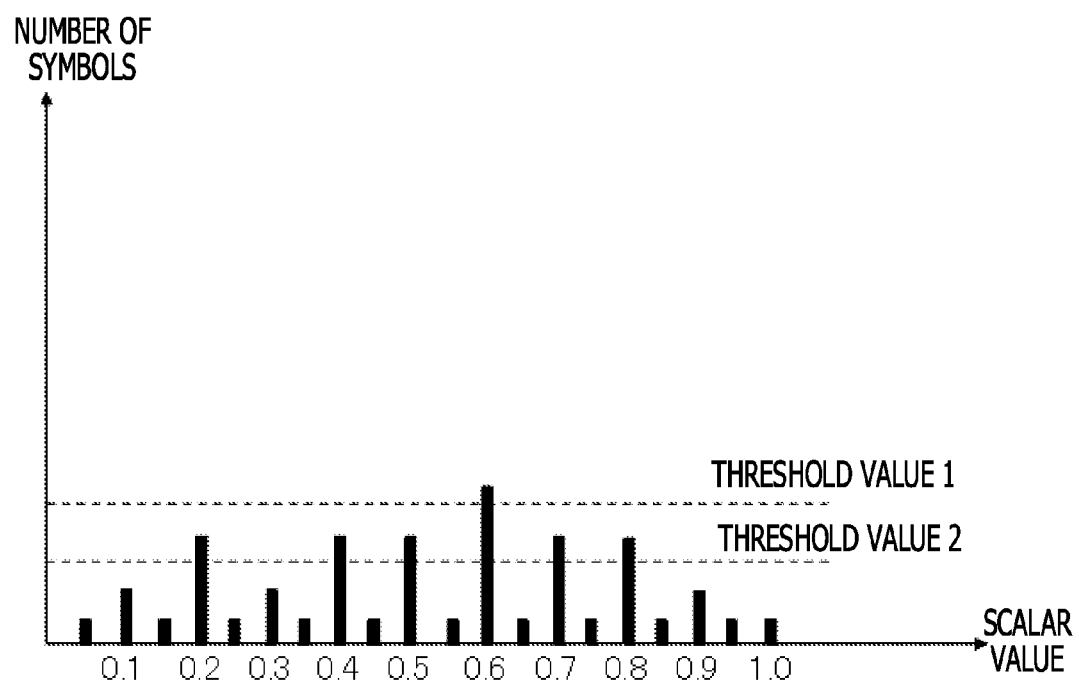
FIG. 19 illustrates an example of a determination method for a modulation method 64QAM.

In FIG. 19, since the distribution ratios of peaks are different, two threshold values are provided. Under the condition that five peaks of numbers of symbols are located between a threshold value 1 and a threshold value 2 only exist, determination may be performed.

Figure 20:
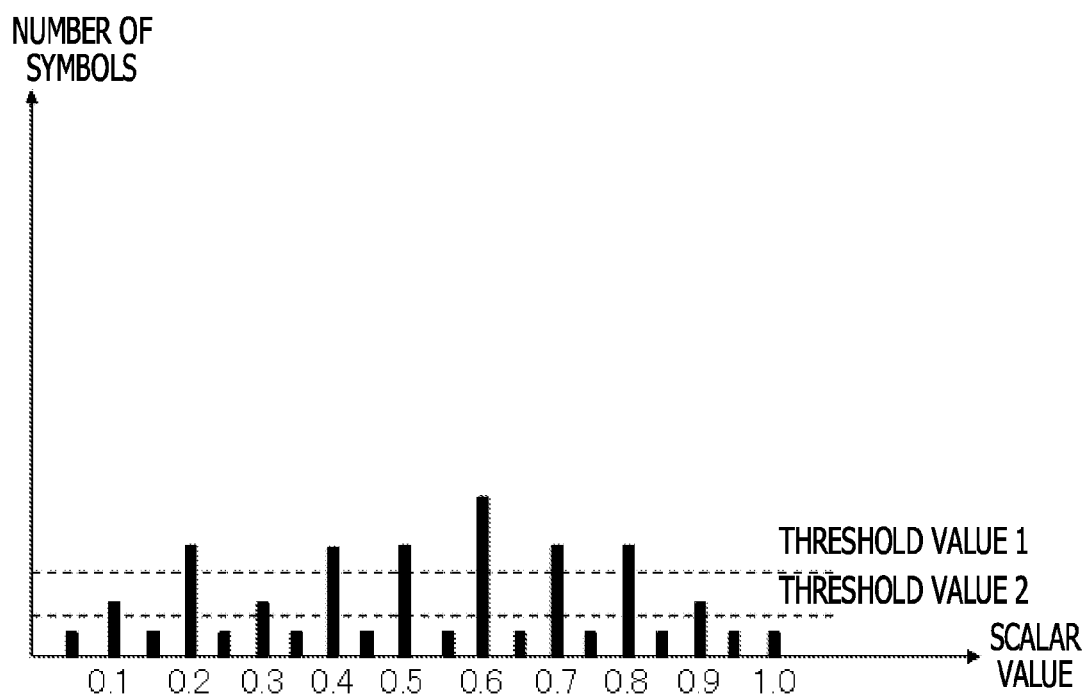
FIG. 20 illustrates an example of a determination method for a modulation method 64QAM.

In FIG. 20, since the distribution ratios of peaks are different, two threshold values are provided. Under the condition that three peaks of numbers of symbols are located between a threshold value 1 and a threshold value 2 only exist, determination may be performed.

Figure 21:
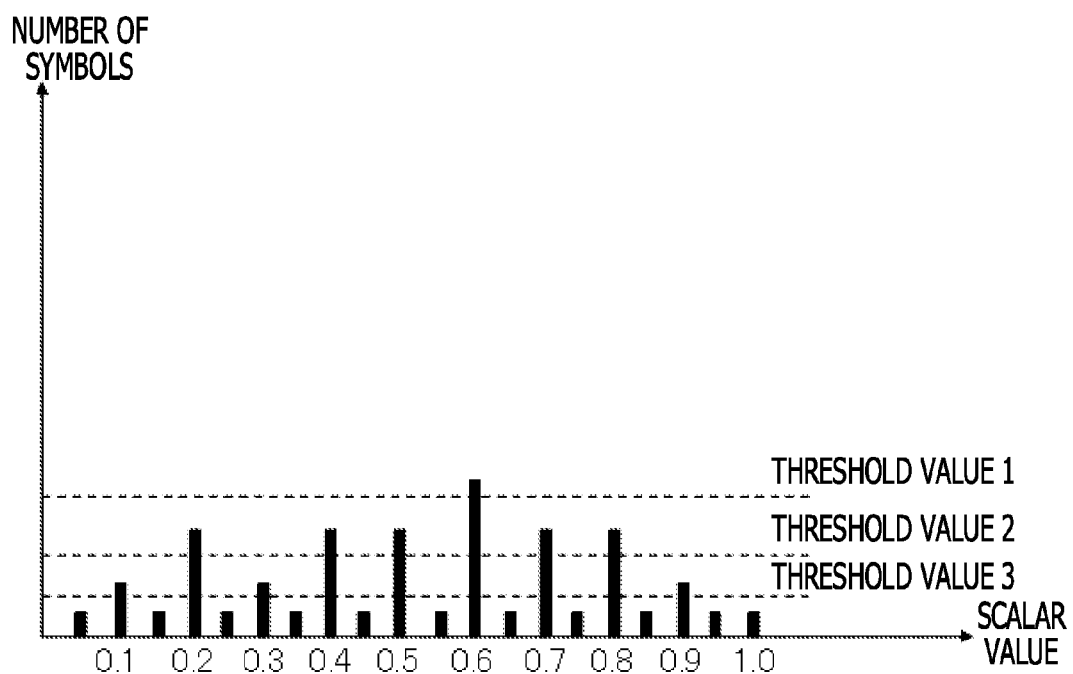
FIG. 21 illustrates an example of a determination method for a modulation method 64QAM.

In FIG. 21, since the distribution ratios of peaks are different, three threshold values are provided. One peak distribution may be determined at or above a threshold value 1, six peak distributions may be determined at or above a threshold value 2, and nine peak distributions may be determined at or above a threshold value 3.

The five peak distributions of numbers of symbols exist between the threshold value 1 and the threshold value 2 may be determined based on being less than or equal to the threshold value 1 and greater than or equal to the threshold value 2. The three peak distributions of numbers of symbols exist between the threshold value 2 and the threshold value 3 may be determined based on being less than or equal to the threshold value 2 and greater than or equal to the threshold value 3.

As illustrated in FIG. 7A to FIG. 7C and FIG. 8A and FIG. 8B, the signal points of the 64QAM are disposed within the constellation, and what circumference of a circle the amplitudes of signal points are disposed on and how many signal points are placed on the circumference of each circle are confirmed. Therefore, with respect to the total number of symbols, which peak symbols of what percent come to is confirmed, and a threshold value, the threshold value 1 and the threshold value 2, or the threshold value 1, the threshold value 2, and a threshold value 3 may be determined. An experiment may be performed on a determined value, and the threshold value, the threshold value 1 and the threshold value 2, or the threshold value 1, the threshold value 2, and the threshold value 3, which are optimum values, may be determined.

Based on the positions of signal points unique to a modulation method within a constellation, a threshold value is provided, and determination is performed on the receiving side. Even if the transmitting side uses any type of modulation method, the convergence of polarization separation processing on the receiving side is determined. Based on the determination, the start of phase synchronization processing in a subsequent stage is triggered.

Using hardware, the logic of a determination method may be incorporated into, for example, the number-of-distributions determination circuit 40 for distributions exceeding a threshold value, illustrated in FIG. 5.

An optical digital coherent receiver may not stably operate immediately after start-up, and may be sequentially started up from a block in a preceding stage. As for the start-up, usually, on the assumption of the worst case, a start-up time is set to a slow time. Since the amplitude distribution of a signal is used as an index for a stable operation, the stable operation of the subsequent stage is quickly started by the polarization separation processing. Therefore, at the time of the start-up of a device or at the time of switching a modulation method, a time taken to the stable operation of the device may be shortened.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical receiver comprising:
 a polarization separation circuit configured to perform polarization separation on a received signal and output polarized signals; and
 a determination circuit configured to trigger a start of digital signal processing in a stage subsequent to the polarization separation circuit when it is determined that a distribution of a peak of an amplitude of one of the polarized signals has a characteristic corresponding to a modulation method used on a transmitting side.

2. The optical receiver according to claim 1, wherein the determination circuit detects the distribution of the peak of the amplitude obtained from values of an I signal and a Q signal for each of the polarized signals.

3. The optical receiver according to claim 2, wherein the distribution is a distribution obtained by counting a number of symbols of the received signal for each amplitude.

4. The optical receiver according to claim 3, wherein the determination circuit triggers the start when a number of peaks having the number of symbols specified by a threshold value coincides with a number of peaks based on the modulation method.

5. The optical receiver according to claim 3, wherein the determination circuit detects the number of peaks having the number of symbols specified by a plurality of threshold values, and triggers the start when the number of peaks coincides with the number of peaks determined by the modulation method.

6. The optical receiver according to claim 4, wherein the determination circuit trigger the start when detecting that the number of peaks specified by a threshold value at a plurality of times.

7. The optical receiver according to claim 1, further comprising:
a timer configured to control a start timing of a determination processing by the determination circuit.

8. An optical reception method comprising:
performing by a polarization separation circuit, a polarization separation on a received signal and outputting polarized signals;
determining that a distribution of a peak of an amplitude of one of the polarized signals has a characteristic corresponding to a modulation method used on a transmitting side; and
triggering a start of digital signal processing which is performed in a stage subsequent to the polarization separation processing based on a determination result.

9. The optical reception method according to claim 8, further comprising:
comparing the amplitude of one of the polarized signals with a threshold value; and
comparing a number of signal points having amplitudes exceeding the threshold value with a number of peaks based on the modulation method.

10. An optical reception system comprising:
a hybrid circuit configured to subject an optical signal to polarization separation;
a photodetector configured to convert an output from the hybrid circuit into an electrical signal;
an analog-digital converter configured to convert the electrical signal into a digital signal; and
a digital signal processing circuit configured to process the digital signal, wherein the digital signal processing circuit includes:
a polarization separation circuit configured to perform polarization separation on an optical signal that has not been polarization-separated by the hybrid circuit, and output polarized signals; and
a determination circuit configured to trigger a start of digital signal processing in a stage subsequent to the polarization separation circuit when it is determined that a distribution of a peak of an amplitude of one of the polarized signals has a characteristic corresponding to a modulation method used on a transmitting side.

* * * * *